United States Patent
Harms

(10) Patent No.: US 7,367,147 B2
(45) Date of Patent: May 6, 2008

(54) COATED FOLDED ULTRASONICALLY SEALED YARD SIGN

(75) Inventor: Jeffrey W. Harms, Lawrence, KS (US)

(73) Assignee: Gil Studios, Inc., Shawnee Mission, KS (US)

( * ) Notice: Subject to any disclaimer, the term of this patent is extended or adjusted under 35 U.S.C. 154(b) by 0 days.

(21) Appl. No.: 11/513,665

(22) Filed: Aug. 31, 2006

(65) Prior Publication Data

US 2007/0095455 A1    May 3, 2007

Related U.S. Application Data

(62) Division of application No. 10/716,214, filed on Nov. 18, 2003, now Pat. No. 7,101,450.

(51) Int. Cl.
*G09F 15/00*    (2006.01)
(52) U.S. Cl. ............... 40/606.18; 40/607.05; 40/607.06; 156/73.1
(58) Field of Classification Search ............ 40/606.18, 40/607.05, 607.06; 156/73.1, 227, 384, 555, 156/580.1, 580.2
See application file for complete search history.

(56) References Cited

U.S. PATENT DOCUMENTS

| | | | | |
|---|---|---|---|---|
| 3,757,443 A | * | 9/1973 | Miller et al. | 40/594 |
| 4,259,803 A | * | 4/1981 | Sittler | 40/607.03 |
| 5,512,122 A | * | 4/1996 | Sokyrka | 156/275.5 |
| 5,937,555 A | * | 8/1999 | Query | 438/14 |
| 6,037,028 A | * | 3/2000 | Reinders | 428/40.1 |
| 6,397,451 B1 | * | 6/2002 | Gill | 29/469.5 |

* cited by examiner

*Primary Examiner*—Cassandra Davis
(74) *Attorney, Agent, or Firm*—Shughart Thomson & Kilroy PC; Dennis A. Crawford; Malcolm A. Litman

(57) ABSTRACT

A single pass process and apparatus for manufacturing a folded yard sign from a pre-cut sheet previously coated on both sides with a fusible polymer includes the steps of printing an image on an outside of the sheet, curing the image, scoring the printed sheet, folding the scored sheet, ultrasonically sealing regions along side edges of the folded sheet, and stacking the sealed sheets, which are finished sign products ready for packaging. The ultrasonic sealing fuses the polymer coated inside surfaces along the edges of the folded sheet. The sealed side edges form a sign support receiving pocket in the finished sign member in cooperation with a folded edge of the sign member.

14 Claims, 3 Drawing Sheets

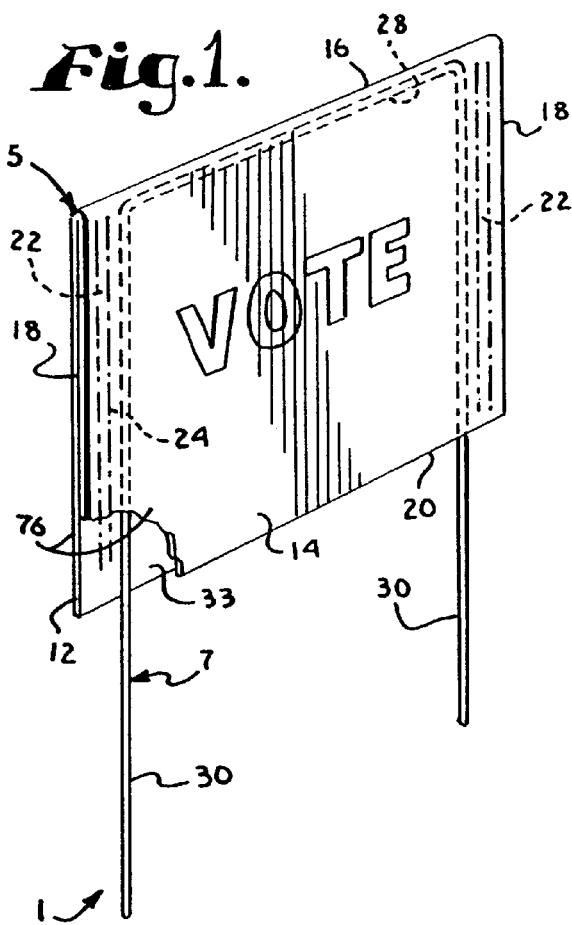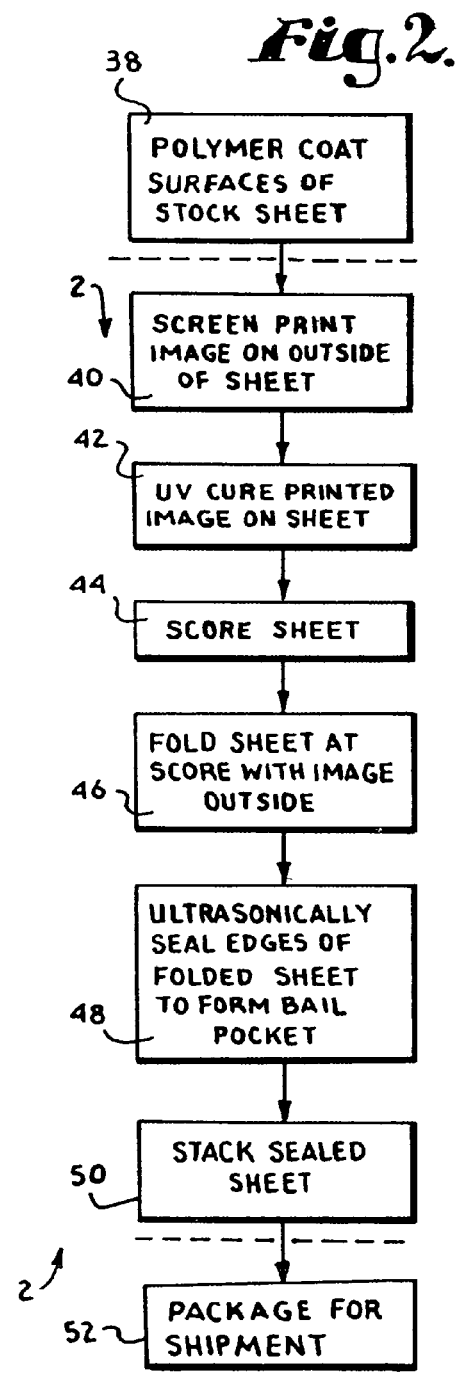

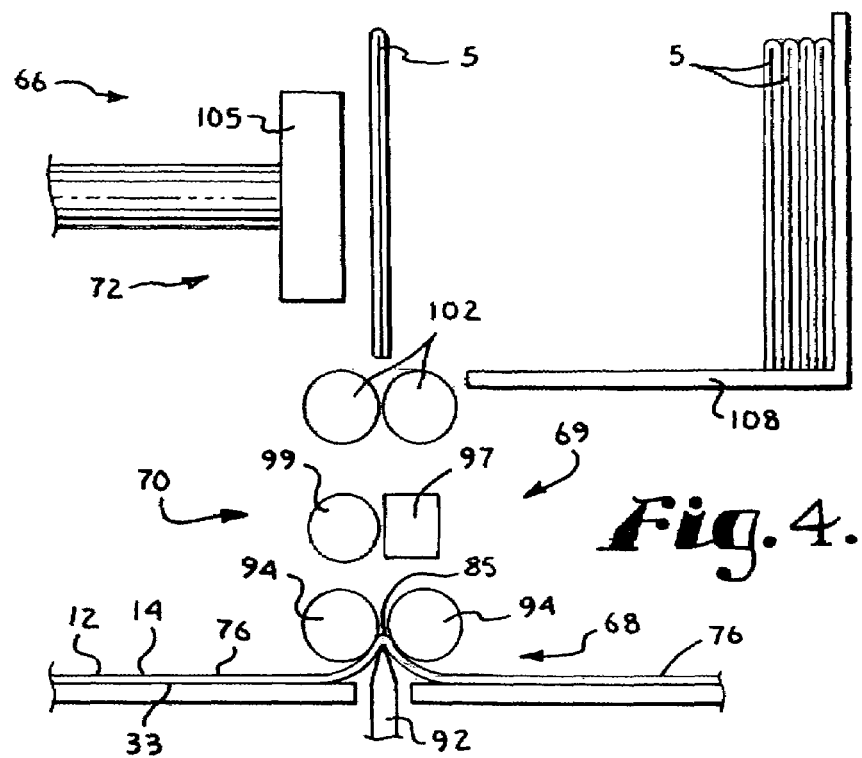
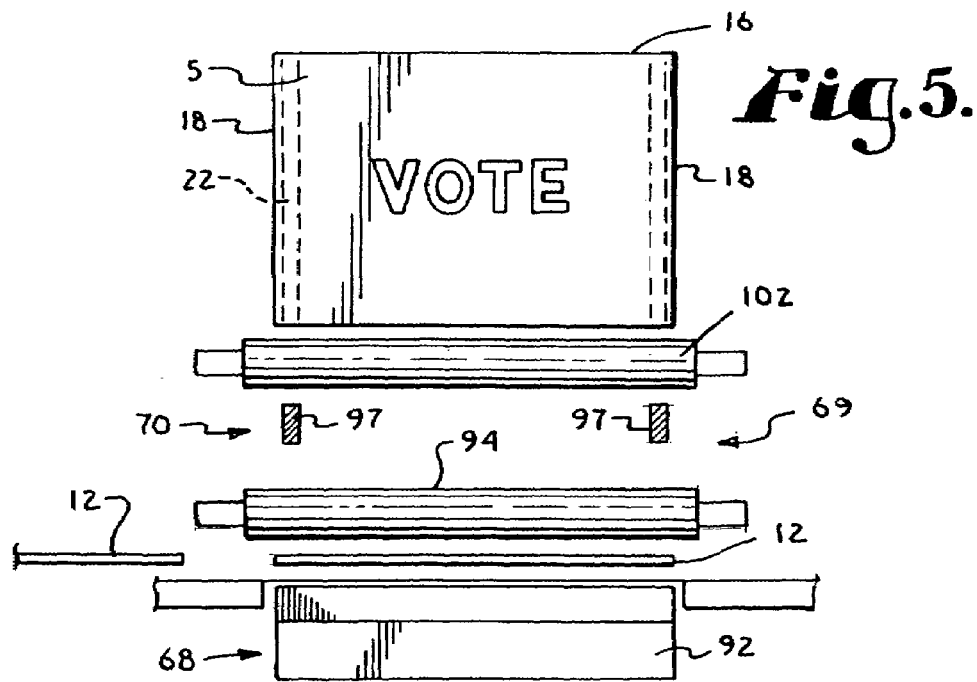

COATED FOLDED ULTRASONICALLY SEALED YARD SIGN

CROSS-REFERENCE TO RELATED APLICATION

This is a Divisional Application claiming benefit under 35 U.S.C. 121 from application, Ser. No. 10/716,214 for COATED FOLDED ULTRASONICALLY SEALED YARD SIGN filed Nov. 18, 2003, which is now U.S. Pat. No. 7,101,450, which is incorporated herein by reference.

BACKGROUND OF THE INVENTION

The present invention relates to temporary signage and, more particularly, to an improved process and apparatus for manufacturing folded yard signs.

Temporary yard signs are useful for a wide variety of purposes, such as for political campaigning, indicating availability of property for sale or rent or open houses, announcements of yard or garage sales, giving directions to various events or places, and the like. In the past temporary signs were formed of a single panel displaying information on only one side and attached to a sign support, such as a long wooden stake, by staples, nails, or similar fasteners. More recently, two sided signs have been devised which are formed by two sheets stapled together or by a single folded-over sheet with the edges joined, as by staples, or sealed by a hot melt adhesive, creating an inverted pocket to receive a sign support, such as an inverted, rectangular, U-shaped wire bail, the legs of which are inserted into the ground.

Because such signs are only intended for temporary use, it is desirable for them to be inexpensive. However, it is also desirable that such signs, when in use outdoors, remain in good enough condition that they effectively convey a desired message. For this reason, typical materials for temporary signs for outdoor use have been paper card stock coated or impregnated with a waterproof material, such as a polymer like polyethylene. Additionally, the such signs are often printed using screen printing techniques and ultraviolet cured printed ink, resulting in dense ink patterns with high visibility and durability, although other inks and curing systems may be used.

In the past, the sided yard signs were often formed by scoring and folding a sheet with an image printed thereon. Then the edges of the folded sheet were sealed using an adhesive, such as a hot melt adhesive which was applied in a line along the side edges of the folded sheet. In a more recent manufacturing process, lines of the polyethylene coating along the side edges on the inside of the folded sheet were fused using ultrasonic energy, thereby avoiding use of a separate adhesive. However, the manner of practicing this process included manual folding of scored sheets and manual insertion of the folded sheets into an ultrasonic edge sealing machine. Manual folding and handling of the sign stock adds a labor cost to the sign product and limits the efficiency of production of such signs, thereby reducing production time and labor costs.

What is needed is a process for manufacturing folded temporary outdoor signs which maximizes mechanical handling and processing of the sign stock.

SUMMARY OF THE INVENTION

The present invention provides an improved process and apparatus for forming temporary yard signs of the type described. In a preferred embodiment of the process, precut and pre-coated sign stock is employed. The card stock is coated with a relatively standard thickness of a polymer, such as polyethylene on an image side that is to be printed on. A similar coating of the polymer is applied to the side of the sheet that is to be inside the folded sign. The sign forming apparatus generally includes a screen printing station, an image curing station, a sheet scoring station, and a sheet finishing station including a sheet folding mechanism, a sheet edge sealing device, and a sign member stacking station.

The sheet is screen printed on the image side, and the image is cured with ultraviolet light. The sheet then is scored along its center by sheet scoring dies to form a fold line, and the scored sheet is then folded at the fold line. The folded sheet is passed through a pair of laterally spaced sets of ultrasonic horns and anvil rollers, which are activated to mechanically heat the edges of the folded sheet to melt the polymer layers inside the sheet to adhere the edges together. The folded edge and the sealed edges form a pocket to receive a rectangular sign support bail. The folded sheet with the side edges sealed is then stacked for subsequent packaging and shipping to a warehouse or a customer.

The sheet is folded by a conventional type of sheet folding device in which the scored sheet is positioned so that the scored fold line is aligned with a folding knife positioned below a lower set of nip rollers. The knife is extended upwardly to urge the sheet at the fold line into engagement with the lower nip rollers. The lower nip rollers crease the sheet at the fold line and propel the edges of the folded sheet through transversely spaced ultrasonic sealing assemblies, each including an ultrasonic horn and an anvil roller. The ultrasonic horn is electrically activated to apply ultrasonic energy to the contacted area of the side edges, thereby heating and fusing or melting the polyethylene layers inside the folded sheet.

In the process of the present invention, as the folded sheet moves through the sealing assemblies, the folded edge engages an upper set of nip rollers. The upper nip rollers insure that the fused edge regions do not separate before cooling and, further, propel the folded and sealed sheet into a stacker mechanism where a plunger urges the folded sign product into a stack.

The process steps described above form a single pass folded sign manufacturing process of the present invention which minimizes manual handling of the sign stock and maximizes efficiency of production of the folded sign products.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a folded yard sign formed by a single pass process which is an embodiment of the present invention.

FIG. 2 is a block diagram illustrating steps for forming a yard sign according to the process of the present invention.

FIG. 4 is an enlarged diagrammatic side elevational view of a folding, sealing, and stacking station of the process of the present invention.

FIG. 5 is an enlarged diagrammatic transverse sectional view of the folding, sealing, and stacking station of the process of the present invention.

DETAILED DESCRIPTION OF THE INVENTION

Figure 3:
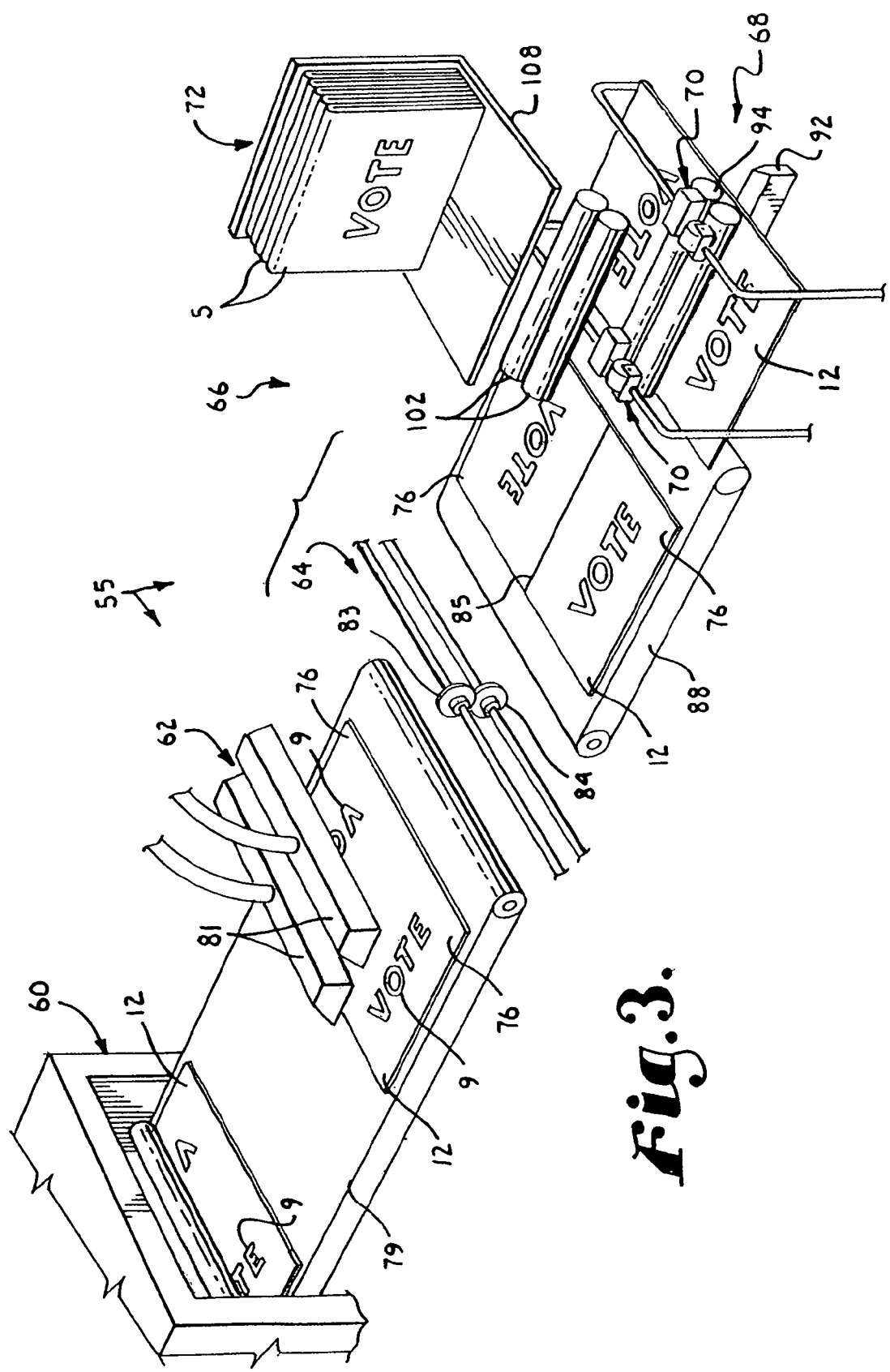
FIG. 3 is a diagrammatic perspective view of the process for forming a yard sign according to the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a yard sign assembly which is manufactured by a single pass process 2 which embodies the present invention. The sign assembly 1 includes a two sided sign member 5 which receives a sign support bail 7 adapted for insertion into the ground to display an image and/or indicia 9 printed on opposite sides of the sign member 5.

The sign member 5 is formed by a sheet 12 of a sign stock which has the image 9 printed on an external surface 14 and which is folded in half at an upper folded edge 16 to form opposite side edges 18 and a lower end edge 20. Elongated seal regions 22 are formed along the side edges 18, as will be detailed below, to form a downwardly opening support receiving pocket 24, in cooperation with the folded edge 16, to receive the bail 7. The illustrated bail 7 is an inverted rectangular U-shaped member formed from a stiff wire, such as a steel wire, and includes an upper cross member 28 with vertical legs 30 depending therefrom. Although the inverted U-shaped configuration of the bail 7 is preferred, it is foreseen that other types of sign support configurations could be employed, such as a centrally positioned wooden stake, a T-shaped sign support, or the like. In the case of a centrally positioned stake, it might be desirable to provide additional seal regions inboard of the illustrated seal regions 22 located at the side edges 18.

In the process 2 of the present invention, the seal regions 22 are formed without the use of a separate adhesive, such as a hot-melt adhesive as commonly employed. The process 2 employs a sign stock which is coated with a fusible material, at least on an inner surface 33 of the sheet 12. In the process 2, the seal regions 22 are formed by heating the regions 22 after the sheet 12 is folded to bring opposite halves of the inner surface 33 into mutual contact to fuse or melt the coating thereon and by allowing the fused coating on the opposite halves to join, adhere or seal, and solidify upon cooling. The coating applied to the sheets 12 of sign stock is preferably a polymer or synthetic resin composition such as a polyethene, which is commonly referred to as polyethylene. Alternatively, other fusible coating materials are contemplated.

In the process of the present invention, it is preferred that both the inner surface 33 and the outer surface 14 of the sheet 12 be coated with polyethylene. Coating of the outer surface 14 is a conventional measure taken with such signs to render them resistant to weather, particularly moisture. Although the thickness of coatings on the inner surface 33 and the outer surface 14 could be the same, the thickness which is required for adequate fusing to seal the regions 22 is or may be generally greater than that required on the outer surface 14 for weather resistance. Therefore, the sign 1 is preferably formed from a sign stock having a thicker coating on the inner surface 33 than on the outer surface 14 of the sheet 12.

A particularly suitable sign stock for the sign 1 and process 2 is "milk carton" stock and is available from a number of manufacturers. Such stock typically has some "wet strength" even without resin coating. However, the stock is usually coated on both sides with polyethylene. The resin is not only applied to the surfaces but is also forced by pressure to impregnate the paper-like base stock. For the sign 1 and process 2, the preferred base stock has a thickness within a range of 17.5 to 24 "points" (mils or thousandths of an inch), which may also be stated as 0.444 to 0.610 millimeter. Good sealing results have been obtained with a polyethylene thickness of about 0.875 mil (0.0222 mm) on the inside surface 33 with a matte surface finish. Adequate weathering and printing characteristics have been obtained with a polyethylene thickness of about 0.5 mil (0.0127 mm) on the outside surface 14 with a glossy surface finish. It is foreseen that polyethylene thicknesses somewhat greater or lesser than stated above would also be suitable for the sign 1 and process 2.

Referring to FIG. 2, the process 2 is a single pass process for manufacturing the yard sign 1. In the illustrated step 38, the sign stock sheet 12 is coated, at least on the inner surface 33, although it is preferred that the sheet 12 also be coated on the outer surface 14. The step 38 is preferably performed prior to initiating the single pass process 2. Thus, the sheets 12 are preferably obtained from a supplier in a pre-coated condition.

The single pass process 2 properly begins at step 40 with screen printing a desired image onto the outer surface 14 of the sheet 12. At step 42, the printed image 9 is cured; then the printed sheet 12 is scored at step 44 to form a fold line at the folded edge 15 of the sign member 5. The scored sheet 12 is folded at step 46, after which the side edges 18 are sealed by ultrasonically heating the seal regions 22 at step 48. Finally, the folded and sealed sheets 12 forming the sign members 5 are stacked at step 50 for subsequent binding or packaging for storage or shipping to a customer at step 52.

FIGS. 3-5 illustrate a sign forming apparatus 55 for performing the steps 40-50 of the single pass sign manufacturing process 2. FIG. 3 diagrammatically illustrates the apparatus 55 including a screen printing station 60, a curing station 62, a scoring station 64, and a finishing station 66 including a folding mechanism 68, a sealing station or heating zone 69 including a pair of ultrasonic sealing devices 70, and a stacking mechanism which correspond, except for the finishing station, to the steps 40-50 of the single pass process 2.

The printing station 60 is a conventional screen printing process. Screen printing processes are typically used for outdoor sign such as the sign 1 because they deposit a relatively thick layer of ink which resists fading from moisture and solar exposure and which provides bold images 9 which have a high visibility. The illustrated screen printing station 60 prints mutually inverted images 9 on the outer surface 14 of respective panels 76 of the sheet 12 which will become opposite panels of the finished sign member 5 after the sheet 12 is folded. The illustrated sheet 12 is carried from the printing station 60 to the curing station 62 by a conveyor section 79. At the curing station 62, the printed images 9 are cured. Ultraviolet energy from the illustrated lamps 81 cures the ink deposited in selected patterns on the panels 76 of the sheet 12. Alternatively, other ink curing processes could be employed in the process 2. Although a single screen printing station 60 and a single curing station 62 are illustrated, it is foreseen that multiple printing and curing stations 60 and 62 could be provided for printing multi-colored images 9 on the sheet 12.

The conveyor section 79 conveys the sheet 12 with the printed and cured image 9 to the scoring station 64 where the sheet 12 engages a set of rotary scoring dies or wheels 83 and 84. The upper and lower scoring dies 83 and 84 deform the sheet 12 along a fold line 85 to facilitate folding of the sheet 12 by the folding mechanism 68 without breaking or tearing of the sheet 12. The dies 83 and 84 can be configured to provide a simple V-shaped impression or more complex impressions, depending on the materials forming the sheet 12, its thickness, and the desired degree of creasing of the sheet 12 when it is folded.

Downstream of the scoring station 64, a second conveyor section 88 picks up the scored sheet 12 and conveys it to the finishing station 66 where the scored sheets 12 are continuously driven through the folding mechanism 68, the heating zone 69, and into the stacking mechanism 72. The sheet 12 is positioned by the conveyor 88 and other devices not illustrated to align the fold line 85 with a folding knife 92 of the folding mechanism 68. Referring to FIGS. 4 and 5, the folding knife 92 is aligned with a pair of lower nip rollers 94. The folding knife 92 is actuated upwardly, as by a pneumatic actuator (not shown), to drive the sheet 12 at the fold line 85 into engagement between the lower nip rollers 94. The lower nip rollers 94 are mutually rotated in such a manner as to propel the sheet 12 upwardly between them, thereby creasing the sheet 12 at the fold line 85 and folding the sheet substantially in half with the inner surface 33 folded inwardly on itself so that the inner surfaces 33 of the panels 76 are mutually facing.

As the sheet 12 is urged through the lower nip rollers 94, the sheet 12 is conveyed through the sealing devices 70, each including an ultrasonic "horn" 97 and an anvil roller 99. The horn 97 is activated to apply ultrasonic energy to the seal regions 22 along the side edges 18 of the sheet 12. The ultrasonic energy heats and fuses or melts the polyethylene coating on the inner surfaces 33, causing the inner surfaces 33 to mutually adhere in the seal regions 22. The seal regions 22 may have a width within a range of about one sixteenth to one half inch (1.5875 to 12.7 mm). The width of the seal regions is determined by the configuration of the ultrasonic horns 97 and the width of the radiated energy that the horns 97 propagate. Although the seal regions are illustrated as extending continuously along the entire length of the side edges 18, the seal regions 22 could alternatively extend along only a substantial portion of the side edges 18. Additionally, the seal regions 22 could also be intermittent. The determining factor in the configuration of the seal regions 22 is whether the bonding strength of the fused seals are sufficient to remain intact in typical outdoor service in which the sign 1 could be subject to stresses from varying temperatures and winds.

Referring to FIGS. 4 and 5, a pair of upper nip rollers 102 are positioned above the sealing station 70 and receive the folded sealed sheet 12 as it exits the sealing station 70. The rollers 102 further crease the sheet 12 at the fold line 85 and press the panels 76 together to insure that the panels 76 do not separate at the seal regions 22 until the heated polyethylene cools. Additionally, the rollers 102 propel the finished sign member 5 into the stacking mechanism 72. The stacking mechanism 72 includes a plunger 105 which is actuated, as by a pneumatic actuator (not shown) to urge the finished sign member 6, which is just exiting the upper nip rollers 102 onto a stacking platform 108. On the stacking platform 108, groups of the finished sign members 5 are collected and may periodically be offloaded onto a take-away conveyor (not shown) which carries the groups of sign members 5 to a station (not shown) for binding or packaging for shipment to customers.

The single pass process 2 manufactures the finished sign members 5 from previously coated and cut sheets 12 of sign stock without manual handling from printing to stacking. By these means, increased productivity and reduced labor costs can be realized over processes which employ manual handling of the stock between the various production stages.

It is to be understood that while certain forms of the present invention have been illustrated and described herein, it is not to be limited to the specific forms or arrangement of parts described and shown.

The invention claimed is:

1. A yard sign formed by a single pass process for forming yard signs from individual sheets of sign stock and comprising the steps of:
   (a) conveying each two sided sheet of a sign stock to a printing station and screen printing an image on an image side of said sheet, said sheet being coated on both sides with a fusible polymer having a first thickness on said image side and a greater second thickness on an inner side opposite said image side;
   (b) conveying the printed sheet to a scoring station and scoring said sheet to form a fold line along said sheet;
   (c) conveying the scored sheet to a folding mechanism and folding said sheet in half at said fold line to form a folded sheet with said image side on an outside of said folded sheet; said folded sheet having a folded edge, an end edge opposite said folded edge, and opposite side edges extending respectively between said folded edge and said end edge; and
   (d) conveying the folded sheet to a sealing device and heating each of said side edges of said folded sheet to fuse said fusible polymer on said inner side along said side edges to thereby adhere portions of said sheet at said side edges together to form a pocket within said folded sheet to receive at least a portion of a sign support member.

2. A yard sign as set forth in claim 1 wherein said process includes the steps of:
   (a) printing said image as an ink pattern on said sheet; and
   (b) curing said ink pattern.

3. A yard sign as set forth in claim 1 wherein said process includes the steps of:
   (a) providing said folding mechanism with a parallel pair of nip rollers and a folding knife positioned to urge a sheet into engagement with said nip rollers;
   (b) conveying the scored sheet to a position which aligns said fold line with said folding knife;
   (c) extending said folding knife toward said scored sheet to urge said sheet at said fold line into engagement with said nip rollers; and
   (d) rotating said nip rollers to propel said scored sheet between said nip rollers to thereby fold said scored sheet at said fold line.

4. A yard sign as set forth in claim 3 wherein said heating step includes the steps of:
   (a) providing a pair of sets of an ultrasonic horn and an ultrasonic anvil, said sets being positioned in a selected spaced relation to said nip rollers and being spaced apart substantially equal to a distance between said side edges; and (b) propelling said folded sheet by said nip rollers through said sets of an ultrasonic horn and an ultrasonic anvil whereby each ultrasonic horn heats a respective side edge of said folded sheet.

5. A yard sign as set forth in claim 4 wherein said pair of nip rollers are a pair of first nip rollers and including the steps of:
 (a) providing a parallel pair of second nip rollers positioned in spaced relation to said first nip rollers with the ultrasonic horns and anvils positioned between said first nip rollers and said second nip rollers;
 (b) engaging said folded sheet with said second nip rollers subsequent to said folded sheet being propelled through said sets of said ultrasonic horns and anvils; and
 (c) propelling said folded sheet by said second nip rollers to a stacking station.

6. A yard sign formed by a single pass process for forming yard signs from individual sheets of sign stock and comprising the steps of:
 (a) screen printing an image on an image side of each two sided sheet of a sign stock coated with a fusible polymer having a first thickness on said image side and a greater second thickness on an inner side opposite said image side, said printing step including the steps of:
  (1) printing said image as an ink pattern on said image side of said sheet; and
  (2) curing said ink pattern using ultraviolet light;
 (b) scoring said sheet to form a fold line along said sheet;
 (c) folding said sheet in half at said fold line to form a folded sheet with said image side on an outside of said folded sheet; said folded sheet having a folded edge, an end edge opposite said folded edge, and opposite side edges extending respectively between said folded edge and said end edge, said folding step including the steps of:
  (1) providing a folding mechanism including a parallel pair of nip rollers and a folding knife positioned to urge a sheet into engagement with said nip rollers;
  (2) conveying the scored sheet to a position which aligns said fold line with said folding knife;
  (3) extending said folding knife toward said scored sheet to urge said sheet at said fold line into engagement with said nip rollers; and
  (4) rotating said nip rollers to propel said scored sheet between said nip rollers to thereby fold said scored sheet at said fold line; and
 (d) ultrasonically heating each of said side edges of said folded sheet to fuse said fusible polymer on said inner side along said side edges to thereby adhere portions of said sheet at said side edges together to form a pocket within said folded sheet to receive a sign support member, said heating step including the steps of:
  (1) providing a pair of sets of an ultrasonic horn and an ultrasonic anvil, said sets being positioned in a selected spaced relation to said nip rollers and being spaced apart substantially equal to a distance between said side edges; and
  (2) propelling said folded sheet by said nip rollers through said sets of an ultrasonic horn and an ultrasonic anvil whereby each ultrasonic horn heats a respective side edge of said folded sheet.

7. A yard sign set forth in claim 6 wherein said process includes the step of:
 (a) providing said sheet of said sign stock which has a coating of polyethylene with a thickness of approximately 0.5 mil on said image side of said sheet and a coating of polyethylene with a thickness of approximately 0.875 mil on said inner side of said sheet opposite said image side.

8. A yard sign as set forth in claim 6 wherein said pair of nip rollers are a pair of first nip rollers and including the steps of:
 (a) providing a parallel pair of second nip rollers positioned in spaced relation to said first nip rollers with the ultrasonic horns and anvils positioned between said first nip rollers and said second nip rollers;
 (b) engaging said folded sheet with said second nip rollers subsequent to said folded sheet being propelled through said sets of said ultrasonic horns and anvils; and
 (c) propelling said folded sheet by said second nip rollers to a stacking station.

9. A yard sign comprising:
 (a) a sheet of sign stock having opposite side edges, opposite end edges, an image surface, and an inner surface, said sheet being coated on said image surface and said inner surface with a fusible polymer, said fusible polymer having a first thickness on said image side of said sheet and a greater second thickness on said inner side thereof;
 (b) an image printed on said image surface of said sheet;
 (c) said sheet being folded to position a first portion of said inner surface in facing relation to a second portion of said inner surface and in such a manner as to substantially align respective side edges of said first and second portions of said inner surface; and
 (d) said fusible polymer on said inner surface being fused along side edge regions thereof at said side edges to retain said sheet in a folded condition and to form a sign support receiving pocket within said sheet to receive at least a portion of a sign support member.

10. A yard sign as set forth in claim 9 wherein:
 (a) said fusible polymer has a thickness of approximately 0.5 mil on said image side of said sheet and a thickness of approximately 0.875 mil on said inner side thereof.

11. A yard sign as set forth in claim 9 wherein:
 (a) said fusible polymer is polyethylene; and
 (b said polyethylene has a thickness of approximately 0.5 mil on said image side of said sheet and a thickness of approximately 0.875 mil on said inner side thereof.

12. A yard sign as set forth in claim 9 and including:
 (a) a yard sign support member formed of an inverted U-shaped bail including an upper cross member with opposite ends and a pair of spaced apart legs depending from said ends of said cross member; and
 (b) at least a portion of said sign support member being received within said sign support receiving pocket.

13. A yard sign comprising:
 (a) a sheet of sign stock having opposite side edges, opposite end edges, an image surface, and an inner surface;
 (b) said sheet being coated on said image surface and said inner surface with a fusible polymer having a first thickness on said image surface and a greater second thickness on said inner surface;
 (c) an image printed on said image surface of said sheet;
 (d) said sheet being folded to position a first portion of said inner surface in facing relation to a second portion of said inner surface and in such a manner as to substantially align respective side edges of said first and second portions of said inner surface;
 (e) said fusible polymer on said inner surface being fused along side edge regions thereof at said side edges to retain said sheet in a folded condition and to form a sign support receiving pocket within said sheet to receive at least a portion of a yard sign support member;

(f) said yard sign support member being formed of an inverted U-shaped bail including an upper cross member with opposite ends and a pair of spaced apart legs depending from said ends of said cross member; and (g) at least a portion of said sign support member being received within said sign support receiving pocket.

14. A yard sign as set forth in claim 13 wherein:

(a) said fusible polymer is polyethylene; and (b said polyethylene has a thickness of approximately 0.5 mil on said image side of said sheet and a thickness of approximately 0.875 mil on said inner side thereof.

* * * * *